March 19, 1940.   J. H. VAN UUM   2,193,951

SPRING CLIP DEVICE

Filed May 28, 1937

INVENTOR.
JOHN H. VAN UUM
BY
his ATTORNEY.

Patented Mar. 19, 1940

2,193,951

UNITED STATES PATENT OFFICE 2,193,951

SPRING CLIP DEVICE

John H. Van Uum, Lakewood, Ohio

Application May 28, 1937, Serial No. 145,333

2 Claims. (Cl. 24—73)

This invention relates to spring clip devices for securing hollow members such as bead trim and the like to apertured supports.

One of the principal objects of the present invention is to provide a spring clip for such purposes in which the gripping effect between the support and clip, upon installation of the clip, is increased, and in which the connection between the head portions of the clip and the trim member to be secured is enhanced.

Another object is to provide a clip which will remain effectively in position on the support during installation of the bead trim thereon.

A more specific object is to provide a clip having head portions to permit easy engagement of the bead trim with the clip after the clip is installed in the support and which engages and positively locks the trim member to the head portion of the clip.

Another object is to provide a clip having on the shank portion which engages the aperture of the support, positive locking shoulders which engage the inner surface of the support and positively lock the clip against removal axially of the aperture.

Other objects and advantages will become apparent from the following specification, wherein reference is made to the drawing, in which.

Figure 1:
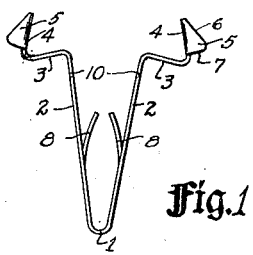
Fig. 1 is an end elevation of a clip embodying the principles of the present invention.
Figure 2:
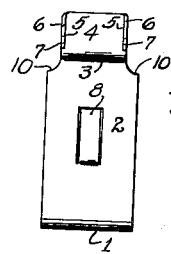
Fig. 2 is a side elevation of the clip illustrated in Fig. 1.

Referring to Figs. 1 to 4, inclusive, the illustrative embodiment of the clip comprises a single piece of spring metal bent intermediate its ends to form a nose 1 with legs 2 divergent away from the nose and having at their free ends, respectively, head portions 3 extending outwardly and toward the outer surface of the support and providing land portions. At the outer ends or free end portions of the head portions beyond the land portions, the metal is bent slightly inwardly and away from the support to provide locking arms 4, each of which is normally wider than the head portions 3 so that the lateral margins thereof would normally extend beyond the portions 3. These lateral margins, however, are in the form of locking lugs 5 and are bent normal to the plane of the arms 4 so as to extend outwardly of the clip. Each of the locking lugs 5 is substantially triangular in shape with its upper edge 6 providing a sloping cam surface and the lower edge 7 providing a locking shoulder.

Figure 4:
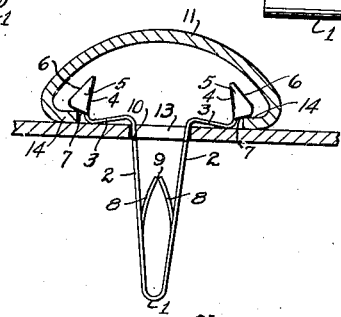
Fig. 4 is a view similar to Fig. 3 showing the trim member held in installed position on the support by the clip.
Figure 3:
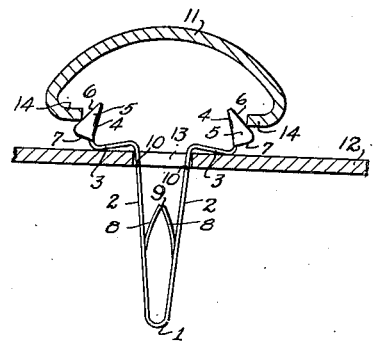
Fig. 3 is an end elevation of the clip installed in the support and a bead trim member in position to be snapped into engagement therewith, the support and trim member being shown in section for clearness in illustration.

Intermediate the ends of each leg 2, a portion of the metal is slit at its upper end limit and along the sides to provide resilient abutment portions 8 which are bent inwardly or offset inwardly from the plane of the legs and are so arranged that when the clip is installed they abut at their upper ends, as indicated at 9 in Fig. 4, under considerable pressure. In the form of clip illustrated, the legs 2 are cut inwardly slightly at their ends adjacent the portions 3 so as to provide locking shoulders 10 for engagement with the inside of the supporting structure when the clip is installed. As illustrated in Figs. 3 and 4, such clips are generally used for connecting elements such as a bead trim 11 to an apertured supporting structure 12 which has one or the desired number of apertures 13 therein. The clip is installed in the aperture 13 nose foremost.

During installation, the legs 2 are flexed relatively toward each other, causing the abutment portions 8 to engage, as indicated at 9, whereupon the resistance to flexure of the legs is considerably increased. Upon continued insertion, the abutment portions 8 assist in urging the legs outwardly and into locking engagement with the support. The abutment portions 8 and the portions of the legs 2 adjacent the nose form in effect a closed spring loop. When the clip is fully inserted, the legs 2 are spread apart so that the locking shoulders 10 engage the inside of the support 12 adjacent the aperture 13. Upon this engagement, the abutments 8 are in abutting relation at their upper ends and exert considerable outward pressure on the legs. When the shoulders 10 are engaged with the under face of the support 12, the outer ends of the head portions 3 abut the outer surface of the support 12, the portions 3 being sprung slightly so that their ends engage the support 12 under resilient pressure.

The elements to be secured to the support are usually hollow with suitable abutment areas for engagement beneath the shoulders 7. For example, in the case of a bead trim 11, the trim is provided with inturned flanges 14 which define the slot in the bottom surface of the bead trim. For installing the bead trim or other element on the clip, it is placed thereon with the flanges 14 resting on the surfaces 6 and is then pressed firmly toward the support which causes the arms 4 to flex inwardly until the flanges 14 pass the lower edges of the surfaces 6, whereupon the arms reflex, disposing the shoulders 7 in tight overlying relation to the inner surfaces of the flanges 14. The shoulders 7 are spaced from the outer surface 12 of the support by the land portions of the heads 3 a distance substantially equal to or slightly greater than the thickness of the flanges 14 at their outermost limits and slope slightly downwardly toward the support inwardly of the clip so that they will accommodate themselves to slight irregularities or differences in gauge of the metal of the flanges 14. The locking lugs 5 engage the flanges only by the edges of the lugs which are relatively sharp and consequently tend to dig into the metal of the flanges 14 and of the bead trim to prevent any subsequent relative movement other than can be effected by actual flexure of the clip. Both the shoulders 7 and the shoulders 10 are so abrupt that the clip cannot be removed from the support nor the bead trim from the clip by forces exerted axially of the aperture.

I claim:

1. A spring clip comprising a strip of spring metal having a portion between its ends in the form of a nose, portions extending therefrom in the form of legs which are spaced from each other, portions beyond the legs in the form of spaced resilient heads movable toward and away from each other for connection with a member to be secured to the clip, and portions of said legs between the ends thereof being offset inwardly from the plane of the legs, respectively, and aligned and positioned with respect to each other and to the legs so as to effect mutual abutting relation with each other at a point between the heads and the nose when the legs are flexed relatively toward each other a predetermined distance.

2. A spring clip comprising a strip of spring metal having a portion between its ends in the form of a nose, portions extending therefrom and in the form of spaced legs, head portions on the legs adapted for connection with a member to be secured to the clip, integral resilient abutment portions on said legs, respectively, between the ends thereof and aligned with and extending relatively toward each other from the planes of the associated legs so as to be moved by the legs into abutting relation with each other upon predetermined movement of the legs relatively together and, when in said abutting relation, defining with the nose and legs a relatively closed spring loop.

JOHN H. VAN UUM.